(12) United States Patent
Cope

(10) Patent No.: US 6,337,367 B1
(45) Date of Patent: Jan. 8, 2002

(54) NON-SHIELDED, TRACK RESISTANT, SILANE CROSSLINKABLE INSULATION, METHODS OF MAKING SAME AND CABLES JACKETED THEREWITH

(75) Inventor: Kyle Edward Cope, Lexington, SC (US)

(73) Assignee: Pirelli Cables and Systems, LLC, Lexington, SC (US)

( * ) Notice: Subject to any disclaimer, the term of this patent is extended or adjusted under 35 U.S.C. 154(b) by 0 days.

(21) Appl. No.: 09/613,943

(22) Filed: Jul. 11, 2000

(51) Int. Cl.$^7$ .............................. C08K 3/10; C08K 5/34; B32B 15/08
(52) U.S. Cl. .................... 524/413; 524/91; 524/102; 524/424; 428/461
(58) Field of Search ................. 428/461; 524/91, 524/102, 413, 424

(56) References Cited

U.S. PATENT DOCUMENTS

| | | |
|---|---|---|
| 3,719,769 A | 3/1973 | Miyauchi et al. |
| 3,735,025 A | 5/1973 | Ling et al. |
| 4,384,944 A | 5/1983 | Silver et al. |
| 4,399,060 A | 8/1983 | Glass |
| 4,426,549 A | 1/1984 | Natwig |
| 4,687,882 A | 8/1987 | Stone et al. |
| 4,894,284 A | 1/1990 | Yamanouchi et al. |
| 5,256,482 A | 10/1993 | Yamanouchi et al. |
| 5,556,697 A | 9/1996 | Flenniken |
| 5,741,858 A * | 4/1998 | Brann et al. ............ 525/101 |
| 5,824,718 A | 10/1998 | Penfold et al. |
| 6,080,810 A * | 6/2000 | Ribarits et al. ........... 524/496 |

FOREIGN PATENT DOCUMENTS

| | | |
|---|---|---|
| GB | 2181437 | 4/1987 |
| JP | 63205340 | 8/1988 |
| JP | 04293945 | 10/1992 |
| JP | 09052985 | 2/1997 |
| JP | 2000034370 | 2/2000 |

* cited by examiner

Primary Examiner—Kriellion A. Sanders
(74) Attorney, Agent, or Firm—Norris, McLaughlin & Marcus

(57) ABSTRACT

An improved silane cross-linked insulation material, a method of making, and a non-shielded electrical power cable including such insulation material which has both weathering and track resistant properties is disclosed comprising (a) a linear low density polyethylene base resin, (b) a black masterbatch comprising a conductive carbon black and a polymer, (c) an antioxidant and (d) an ultraviolet ray inhibitor. The insulation material meets Federal Aviation Administration technical requirements for airport lighting applications.

14 Claims, 1 Drawing Sheet

Figure 1:
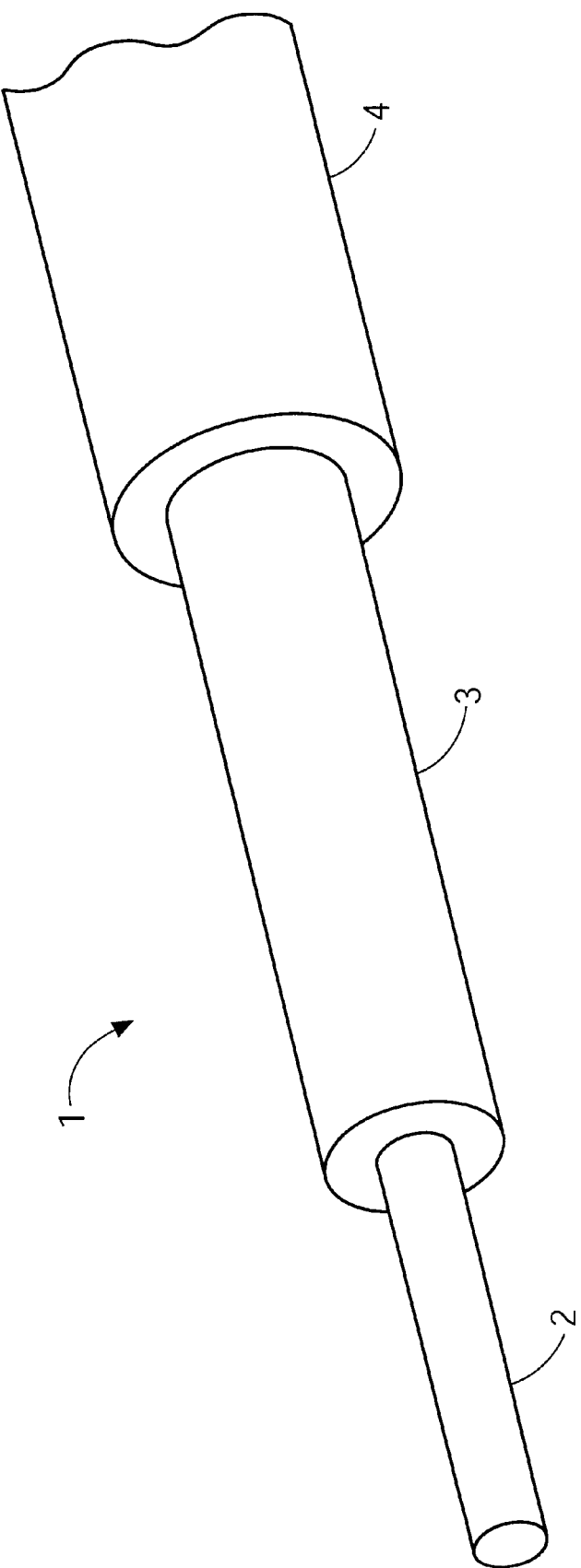

NON-SHIELDED, TRACK RESISTANT, SILANE CROSSLINKABLE INSULATION, METHODS OF MAKING SAME AND CABLES JACKETED THEREWITH

BACKGROUND OF THE INVENTION

1. Field of the Invention

The present invention relates to improved insulation for electrical power cables which has both weathering and track resistant properties. More specifically, the invention has to do with silane cross-linked track resistant insulation comprised of linear low density polyethylene, carbon black, an antioxidant and UV inhibitors. The principle use for this insulation is with 5 kV and low voltage non-shielded electrical power cables in airport lighting applications.

2. The Related Art

In applications where there is no insulation shield, the occurrence of the phenomenon of tracking in polymeric material used as electrical insulation has long been recognized as a source of electrical insulation failure. Generally speaking, this phenomenon results when the non-shielded insulation gradually acquires a conductive film on its surface from contamination, moisture, or polymer degradation which, when the insulation is subjected to a voltage stress, will over time allow a small amount of leakage current to be discharged and conduct along the surface of the insulation. The resulting temperature rise causes a drying out of the insulation. Once this happens the dry surface area so formed can frequently encounter electrical stress greater than the insulation air interface, thereby resulting in a spark or scintillation. The temperatures in the spark interior can quickly degrade the insulation to carbonaceous material that is highly conducting. This in turn leads to additional scintillations and material degradation resulting in premature cable failure.

Airport lighting cables have traditionally been non-shielded because they carry low voltage currents ($\leq 5$ kV) and they are not in the proximity of airport personnel or passengers. The cable is often used in series lighting circuits for runways, control systems, and other parts of the airport. The need for track-resistant properties in such applications stems from the fact that because such cables lack an insulation shield, the cable can be prone to surface discharge. This discharge can track along the surface of the cable leading to premature cable failure.

Underground electrical cables used in airports in the United States must conform with Federal Aviation Administration ("FM") technical specifications entitled "Specification for L-824 Underground Electrical Cable for Airport Lighting Circuits" (hereinafter "FAA L-824"), the contents of which are herein incorporated by reference. Additionally, electrical cables used in such applications must comply with the standards of the National Electrical Manufacturers Association ("NEMA") and the Insulated Cable Engineers Association ("ICEA"), namely NEMA Standards Publication No. WC 7/ICEA Publication No. S-66-524 entitled "Cross-linked Thermosetting Polyethylene Insulated Wire and Cable for the Transmission and Distribution of Electrical Energy", the contents of which are herein incorporated by reference. The insulation of the present invention is designed to be track resistant while also meeting the requirements of these technical specifications and standards.

Non-tracking insulations need to be resistant to water and degradation by ultraviolet ("UV") light. This can commonly be accomplished by adding carbon black to the insulation; however, in airport lighting applications non-tracking insulations are even more sensitive to conductivity because they are non-shielded. That is, they lack an insulation shield. As a result, simply adding the typical amount of carbon black which yields UV protection, such as about 25 percent by weight, also makes the conductivity of the insulation too high so that the insulation loses its non-tracking properties. In order to achieve the required performance, a balance between UV protection and insulative properties, that is, dielectric strength is needed.

According to the present invention, a combination of polymer resin, antioxidant, carbon black and UV inhibitors, and a method of cross-linking same with silane, has been discovered which produces an insulation satisfying the physical, electrical and non-tracking properties set forth in FAA L-824 for airport lighting cables. Therefore, in one embodiment the present invention is a cable insulation designed to reduce the surface discharge of electrical current by giving the insulation enough conductivity so tracking does not occur but not so much that the insulation loses its insulative properties. Additionally, the insulation has enough resistance to weathering to prevent degradation. In another embodiment the invention is a cable comprising a conductor, a conductor shield and the non-tracking cable insulation. In yet another embodiment the invention is a method of making cross-linked, non-tracking electrical cable insulation.

According to the related art, 5 kV track resistant, non-shielded cable can be made using commercially available peroxide cross-linked polymers on a continuous vulcanization ("CV") line. Continuous vulcanization is a continuous, in-line process whereby a wire has an extruded covering applied and is then passed through a tube containing such temperatures and pressures as are necessary to complete cross-linking. Commercially available non-tracking insulation materials of this type includes, for example, LE 4219 from NOVA-Borealis which consists of low density polyethylene ("LDPE"), carbon black (about 0.5 percent by weight), and peroxide. Also, PC 731 from NOVA-Borealis which consists of LDPE, calcium carbonate, peroxide, titanium dioxide and carbon black. Cables employing these insulations in conjunction with CV cured conductor shields such as HFDA-0581 from Union Carbide Corporation and LE 0595 from NOVA-Borealis are also known in the art. These materials, however, are cross-linked on continuous vulcanization lines via peroxide systems which limits the line speed at which cables incorporating this insulation may be manufactured.

U.S. Pat. No. 4,426,549 to Natwig discloses track and erosion resistant electrical insulating materials comprising a base insulating material of a polymer of ethylene and additives to allow the polymer to function as electrical insulation, and hydrated zinc borate as an anti-tracking and anti-erosion additive.

Further, U.S. Pat. No. 4,384, 944 to Silver et al. relates to irradiation cross-linked, polymeric insulation for electric cables which may be a polyethylene doped with carbon black. An exemplary embodiment of the invention comprises a power cable having a central conductor surrounded by two layers of semiconducting and insulating material. Both surrounding layers may comprise polymeric material such as polyethylene which is doped with carbon black of specific grades and in particular concentrations. Exterior armoring or shielding layers may also be present where required.

U.S. Pat. No. 4,399,060 to Glass teaches a semiconductive elastomeric compound comprising a blend of a copolymer of ethylene, alkyl acrylate and mono-alkyl ester of 1,4-butenedioic acid and a copolymer of ethylene with propylene and/or an unconjugated diene. The polymeric material is doped with conductive carbon black and is cured with a peroxide curing agent. Similarly, the polyethylene composions shown in U.S. Pat. No. 5,256,482 to Yamanouchi and U.S. Pat. No. 5,556,697 are cured with organic peroxide curing agents.

These references, however, do not suggest the advantages of the present invention and they have different formulations, applications, or cross-linking methods. The present invention uses a combination of linear low density polyethylene, carbon black and UV inhibitors (as opposed to mineral fillers) to meet the track resistant properties necessary for this application as airport lighting cables. Additionally, the present invention uses commodity resins and cross-linking via silane to significantly reduce the raw material costs. Processing costs also are decreased because the present invention is a moisture cured product capable of being produced at line speeds of about 300 feet per minute as opposed to a CV cured product which generally operates at a significantly lower line speed of about 8 feet per minute.

U.S. Pat. No. 5,824,718 to Penfold et al. relates to silane crosslinkable, substantially linear ethylene polymers and their use as electrical cable insulation. Cable insulations made according to this invention are stated to have enhanced tree resistance, heat resistance, abrasion resistance, flexibility and cure under ambient conditions. Similarities between Penfold and the present invention are that both employ silane crosslinking. However, Penfold uses homogeneously branched, substantially linear ethylene polymers as contrasted with the linear low density polyethylene of the present invention which is a conventional heterogeneously branched polyolefin resin prepared with a coordination catalyst. Furthermore, Penfold does not contemplate, teach or suggest a track resistant insulation nor does this reference teach or suggest the use of carbon black or UV inhibitors to achieve track resistance.

SUMMARY OF THE INVENTION

Accordingly, one object of the present invention is to provide a track resistant insulation for non-shielded electrical power cables which complies with the ICEA S-66-524 and FAA L-824 technical specifications. Another object of the invention is to provide a cost-effective, track resistant insulation by using low cost materials. A still further object of the invention is to provide an electric cable employing a track resisting insulation material which can be manufactured at a significantly faster line speed than a cable employing a track resistant insulation material manufactured by a continuous vulcanization process.

These and other objects and advantages are obtained in accordance with the present invention by forming a silane cross-linked track resistant insulation material for an electrical cable comprising a base resin of linear low density polyethylene ("LLDPE"). Non-tracking and weathering properties are introduced to the base resin via a black masterbatch containing a polymer (such as LLDPE, low density polyethylene or poly (ethylene-co-vinylacetate)) having a melting temperature less than or equal to the melting temperature of the LLDPE base resin, an antioxidant, conductive carbon black and ultraviolet ("UV") ray inhibitors. The antioxidant and UV inhibitor may optionally be included in the LLDPE base resin. Exemplary antioxidants are hindered phenols such as tetrakis [methylene(3,5-di-tert-butyl-4-hydroxyhydrocinnamate)]-methane, bis[(beta-(3,5-ditert-butyl-4-hydroxybenzyl) methylcarboxyethyl)]sulphide, 4,4'-thiobis(2-methyl-6-tert-butylphenol), 4,4'-thiobis(2-tert-butyl-5-methylphenol), 2,2'-thiobis(4-methyl- 6-tert-butylphenol), and thiodiethylene bis(3,5-di-tert-butyl-4-hydroxy)hydrocinnamate; thio compounds such as dilaurylthiodipropionate, dimyristylthiodipropionate, and distearylthiodipropionate; various siloxanes; and various amines such as polymerized 2,2,4-trimethyl-1,2-dihydroquinoline. Antioxidants can be used in an amount of about 0.05 to about 2 weight percent of the total composite insulation material. Additionally, a metal deactivator such as IRGANOX 1035 (thiodiethylene bis(3,5-di-tert-butyl-4-hydroxy)hydrocinnamate) may optionally be included in the black masterbatch or in the LLDPE base resin. The use of a metal deactivator is highly preferred when the central conductor of the electrical power cable is copper.

Herein "silane" is understood to mean any silane composition which includes a crosslinking initiator and a catalyst. Preferably the silane used in the present invention is a mixture of vinyltrimethoxy silane, dicumyl peroxide and dibutyltin dilaurate such as DYNASYLAN® Silfin-06 from Sivento Chemie GmbH or SILCAT R® from Witco Corporation. On a macroscopic level the LLDPE base resin and the polymer of the black masterbatch are cross-linked via the silane composition. That is, the antioxidant, carbon black, metal deactivator and UV inhibitor are not integral parts of the cross-link structure. However, cross-links can terminate on the antioxidant, carbon black, metal deactivator and UV inhibitor to a small degree and therefore these ingredients of the insulation material of the present invention can be part of the cross-link structure.

DETAILED DESCRIPTION OF THE INVENTION

The single FIGURE of the drawing illustrates a single conductor, electric power cable 1 having a central conductor 2 with a conductor shield 3 and an insulation layer 4 extending therearound. The conductor 2 may be stranded as shown or may be a solid conductor.

In one embodiment the invention is comprised of a stranded electrical conductor core encircled by a conductor shield which is semi-conducting layer of tape or extruded plastic. The conductor shield would preferably be peroxide cross-linked if it is extruded or more preferably silane cross-linked. The conductor shield is encircled by a radially uniform layer of silane cross-linked polymer which has a high enough resistance to act as insulation up to about a voltage of 5 kV, but would also be conductive enough to provide track resistance. The silane cross-linked polymer insulation also includes UV inhibitors which provide resistance to UV degradation.

FAA and ICEA specifications for electrical cable in airport lighting applications are set forth in Table 1 below:

TABLE 1

Technical Specifications

| Property | FAA Requirements | ICEA Requirements |
|---|---|---|
| Hot Creep, % | 175 maximum | 175 maximum |
| Hot Set, % | 10 maximum | 10 maximum |
| Track Resistance, hours | 100 minimum | 100 minimum |
| Unaged Physical Properties | | |
| Tensile strength, psi | 1800 minimum | 1800 minimum |
| Elongation, % | 250 minimum | 250 minimum |
| Weathered Physical Properties | | |
| Retained Tensile Strength, % | — | 80 minimum |
| Retained Elongation, % | — | 80 minimum |

Initial attempts to provide an insulation material having the properties necessary to comply with ICEA S-66-524 and FAA L-824 specifications began with the formulation disclosed in Table 2:

TABLE 2

Initial Formulation (KC 10-01)

| Ingredient | Tradename | Weight % |
|---|---|---|
| Linear Low Density Polyethylene | DFDA-7540[1] | 96.8 |
| Black masterbatch | 22,206 ACP[2] | 2(0.500)[4] |
| Silane | SILFIN ™ -06[3] | 1.2 |

[1]DFDA-7540 is a linear low density polyethylene ("LLDPE") from Union Carbide with a 0.7 melt index and a specific gravity of 0.92.
[2]22,206 ACP is a black masterbatch from Teknor Color Company. The black masterbatch is comprised of 1.75% by weight IRGANOX 1010 (an antioxidant) (tetrakis [methylene (3,5-di-tert-butyl-4-hydroxyhydrocinnamate)]-methane), 25% by weight of a proprietary furnace carbon black, and the remainder a linear low density polyethylene.
[3]SILFIN ™ -06 is silane from Sivento Chemie GmbH.
[4]0.500 weight percent of carbon black was present in the final insulation.

Two hundred and fifty (250) grams of the initial formulation KC-10-01, which had been premixed together, was placed in a Brabender mixer with sigma blades rotating at 20 revolutions per minute ("RPM"). The mixer had been preheated to 190° C. and the torque was 1800 meter—grams ('mg"). All of the premixed ingredients (LLDPE, black masterbatch and silane) were added to the mixer within 4 minutes. The ingredients were then mixed for an additional 5 minutes while maintaining the temperature of the mixer at 190° C. Thus the overall mixing time was 9 minutes. The mixed compound was then taken from the mixer, cut up into pieces, and milled on a two roll mill at 135° C. for about 5 minutes. The milled sheet was then cut and molded at 177° C. for 2 minutes at 8 tons low pressure and 20 tons high pressure for 8 minutes. A 10 minute water cool and then a 1 minute air cool followed while maintaining high pressure. Molded plaques were then cured for 18 hours in 90° C. water.

To ensure that the samples had cross-linked, plaque samples were then tested for hot creep at 150° C. following the testing method set forth in ICEA T-28-562 entitled "Test Method for Measurement of Hot Creep of Polymeric Insulations". The samples broke and failed immediately. The previously untested plaque samples were then placed in boiling water for 1 hour and subsequently tested for hot creep. Again the samples failed.

Another attempt was made with the initial formulation, KC10-01; however, in this instance the mixing conditions were modified. The speed of the mixer blades was increased from 20 to 40 RPM to generate more shear and the mixing temperature was increased from 190° C. to 210° C. To improve ingredient dispersion the overall mixing time was increased from 9 to 15 minutes. However, hot creep testing failed again.

A second formulation (KC10-04) was then developed as disclosed on Table 3 to determine if adding more silane would improve the cross-linking. The silane weight percentage was increased from 1.2% to 1.6% and the LLDPE weight percentage was decreased from 96.8% to 96.4%.

TABLE 3

Second Formulation (KC10-04)

| Ingredient | Tradename | Weight % |
|---|---|---|
| LLDPE | DFDA-7540 | 96.4 |
| Black masterbatch | 22,206 ACP | 2(0.500)[1] |
| Silane | SILFIN ™ -06 | 1.6 |

[1]0.500 weight percent of carbon black was present in the final insulation.

The overall mixing time was maintained at 15 minutes and the torque was increased over previous mixing procedures from 1800 mg to 2800–3000 mg. The Brabender mixer was again preheated to 190° C. and the RPM of the sigma blades was set at 20. Two hundred and fifty (250) grams of the second formulation, KC10-04, whose ingredients had been premixed together, were added to the mixer over a 4 minute period. This formulation was then mixed for an additional 11 minutes for a total mixing time of 15 minutes. Milling, plaque preparation and the curing procedure were repeated as with the initial (KC10-01) formulation. Samples were tested for hot creep at 150° C. per ICEA T-28-562 but again the samples failed indicating that cross-linking was unsuccessful because the silane was not being grafted to the LLDPE polymer.

Based on prior laboratory tests where the initial formulation (KC10-01) had been successfully cross-linked when extruded onto copper wire, it was not understood why molded plaques made directly from the Brabender mix did not cure. It was thought that perhaps the pressure (about 1500 psi) present during the extrusion process was responsible for getting the silane to graft in the extruder. This pressure was not present in the mixer. To test this hypothesis, samples of the second formulation (KC10-04) when taken from the mixer were subsequently extruded into rods under the operating conditions described in Table 4.

TABLE 4

Extruder Operating Conditions-Rod Extrusion

| | |
|---|---|
| Extruder Length/Diameter ("L/D") | 20:1[1] |
| Screw Type and Diameter | Maddock 1 1/4" |
| Barrel Profile, ° C. | |
| Zone 1 | 180 |
| Zone 2 | 190 |
| Zone 3 | 200 |
| Screen Pack: | spacer/60/40/14/breaker plate[2] |
| Temperature at rod nozzle, ° C. | 161 |
| Pressure, psi | 580–656 |
| Screw RPM | 19 |
| Torque, mg | 6390–6500 |

[1]Ratio of screw length: screw diameter
[2]A 60 wire by 60 wire per square inch wire mesh, followed by a 40 wire by 40 wire per square inch wire mesh, followed by a 14 wire by 14 wire per square inch wire mesh, followed by a breaker plate.

Additionally, the milling and molding procedure was slightly changed. That is, after mixing of the second formulation (KC10-04) as previously described at 190° C. for 15 minutes at 20 RPM and a torque of 2800–3000 mg, and then extruding the compound under the operating conditions described in Table 4, the compound was milled on a two roll mill at 135° C. (as before) for about 5 minutes. The milled sheet was then cut and molded at 177° C. (also as before), but for 4 minutes (instead of 2 minutes) at 8 tons low pressure and for 8 minutes at 25 tons (instead of 20 tons) high pressure. This was again followed by a 10 minute water and 1 minute air cool while maintaining high pressure. Plaque samples were cured for 16 hours (instead of 18 hours) in 90° C. water. Hot creep and physical properties of these samples were tested. The results appear in Table 5:

TABLE 5

Test Results KC10-04

| Property | KC10-04 Results | FAA Requirements | ICEA Requirements |
|---|---|---|---|
| Hot Creep, %[1] | 40 | 175 maximum | 175 maximum |
| Track Resistance[2], hours | >240 | 100 minimum | 100 minimum |
| Unaged Physical Properties | | | |
| Tensile Strength, psi | 1894 | 1800 minimum | 1800 minimum |
| Elongation, % | 365 | 250 minimum | 250 minimum |
| Weathered Physical Properties | | | |
| Retained Tensile Strength, % | 93 | — | 80 minimum |
| Retained Elongation, % | 30 | | 80 minimum |

[1]Hot creep was performed at 150° C. per ICEA T-28-562.
[2]Track resistance was performed per ASTM D 2132 guidelines.
[3]Weathering of samples was performed per Underwriters Laboratories ("UL") specification 1072 and per ASTM G 26 in Xenon Arc mode for 720 hours.
[4]Unaged and weathered physical properties were tested on 1/4" dumbbells per ASTM D 412 and pulled at 20 inches per minute. Sample gauge length was 1 inch with a jaw separation of 2.5 inches.

The hot creep data indicated that the KC10-04 formulation had cross-linked. Unaged elongation was acceptable; however, the unaged tensile strength was considered marginal and the weathering results for retained elongation showed failure.

To improve the unaged and weathered physical properties, including the UV resistance, the KC10-04 formulation shown on Table 3 was modified. Because the tracking resistance of this formulation had proven to be acceptable, it was decided that increasing the carbon black level could detrimentally alter this property. Therefore, instead, small amounts of UV inhibitor were added during the milling procedure. Thus, the following procedure was followed. A KC10-04 formulation of 723 grams of LLDPE, 15 grams of black masterbatch and 12 grams of silane were premixed together and the mixture was then added over a 4 minute period into a Brabender mixer which had been pre-heated to 190° C. The RPM of the sigma blades was 20 and the torque was 2800–3000 mg. The compound was then mixed for an additional 11 minutes for a total mixing time of 15 minutes. The mixture was then removed from the mixer and extruded into a number of rods under the conditions set forth in Table 6. A second batch of KC10-04 formulation was prepared so that enough formulation was available to prepare a total of seven rods, identified by the letters A through G.

TABLE 6

Extruder Operating Conditions-Rod Extrusion

| | |
|---|---|
| Extruder L/D | 20:1 |
| Screw Type and Diameter | Maddock 1 1/4" |
| Barrel Profile, ° C. | |
| Zone 1 | 180 |
| Zone 2 | 190 |
| Zone 3 | 200 |
| Screen Pack: | spacer/60/40/14/breaker plate |
| Temperature at rod nozzle, ° C. | 174 |
| Pressure, psi | 827–911 |
| Screw RPM | 25 |
| Torque, mg | 3620–3730 |

The extruded rods A through G were then milled on a two roll mill at 135° C. for about 5 minutes. Once the rod material was melted on the mill, UV inhibitors in powder form were added in the amounts set forth on Table 7. The rod material was then blended to disperse the UV inhibitor.

TABLE 7

UV Inhibitor Modifications to KC10-04

| Sample | UV Inhibitor | Quantity (grams)[1] |
|---|---|---|
| A | Titanium dioxide ("$TiO_2$")[2] | 1.125 |
| B | $TiO_2$ | 1.8 |
| C | $TiO_2$ | 4.5 |
| D | $TiO_2$ | 7.5 |
| E | CHIMASSORB 944[3] | 0.6 |
| | TINUVIN 326[3] | 0.6 |
| F | $TiO_2$ | 3.0 |
| G | $TiO_2$ | 1.8 |
| | CHIMASSORB 94 | 0.6 |
| | TINUVIN 326 | 0.6 |

[1]Weights were added to a 150 gram mill load of formulation KC10-04.
[2]KRONOS 2160
[3]From Ciba Geigy. CHIMASSORB 944 is a hindered amine. TINUVIN 326 is a substituted benzotriazole.

The milled sheet was then cut and molded at 177° C. for 4 minutes at 8 tons low pressure and for 8 minutes at 25 tons high pressure. This was followed by a 10 minute water and 1 minute air cool while maintaining high pressure. Plaque samples were cured for 16 hours in 90° C. water and then tested for hot creep and physical properties. The results appear in Table 8.

TABLE 8

Test Results KC10-04 with UV Inhibitors

| Property | Sample A | B | C | D | E | F | G | FAA Reqt | ICEA Reqt |
|---|---|---|---|---|---|---|---|---|---|
| Hot Creep, % | 58 | 125 | 80 | 80 | 65 | 95 | 70 | 175 max. | 175 max. |
| Hot Set, % | 0 | 12.5 | 0 | 0 | 0 | 8 | 0 | 10 max. | 10 max. |
| Unaged Physical Properties | | | | | | | | | |
| Tensile Strength, psi | 1870 | 1889 | 1955 | 1962 | 1771 | NA | NA | 1800 min. | 1800 min. |
| Elongation, % | 167 | 342 | 265 | 316 | 188 | NA | NA | 250 min. | 250 min. |

NA-not available

These results were considered to be unacceptable and inconsistent because they did not meet FAA and ICEA requirements. In addition, it was also noted that the surface texture of the plaque samples was very rough. This was thought to be due to an inhomogeneity of the ingredients. Therefore mixing conditions were again modified to try to improve the homogeneity. Rather than premixing the ingredients of KC10-04 together, the mixer was charged with the LLDPE, then the silane, and then the black masterbatch as disclosed below.

The mixer was heated to 190° C. and the revolutions of the sigma blades were set at 20 RPM. Two hundred and forty-one (241) grams of LLDPE was added to the mixer and then mixed for 10 minutes. Four (4) grams of silane was then added. Upon the addition of the silane, vapors were emitted from the mixer chamber. It was therefore apparent that the mixer was too hot because the boiling point of the silane (SILFIN™-06) was 122° C. The LLDPE and silane were mixed for 2 minutes and then 5 grams of the black masterbatch was added. The LLDPE, silane and black masterbatch were allowed to mix for an additional 7 minutes for a total mixing time from start of 20 minutes. The temperature of the mixer was maintained throughout at 190° C. The RPM was maintained at 20 and the torque was 2380–2500. After mixing, the mixture was extruded and milled as before. No UV inhibitors were added. A plaque sample was tested and yielded excellent physical test results. The unaged tensile strength was 2100 pounds per square inch ("psi") and the unaged elongation was greater than 400%. However, hot creep testing was unsuccessful as the samples broke indicating that the mixture had not cross-linked. This was attributed to the silane volatilizing in the mixer at the high temperatures and not to the low mixing pressure as originally thought.

Therefore, another revision of the mixing procedure was made. Formulation KC10-04 (Table 3) and a revised formulation containing a lesser amount of carbon black, KC10-05, (Table 9) were independently mixed and tested as described below.

TABLE 9

Formulation (KC10-05)

| Ingredient | Tradename | Weight % |
|---|---|---|
| LLDPE | DFDA-7540 | 96.9 |
| Black masterbatch | 22,206 ACP | 1.5(0.375)[1] |
| Silane | SILFIN-06 | 1.6 |

[1]0.0375 weight percent of carbon black was present in the final insulation.

A Brabender mixer with sigma blades was preheated to 110° C. The speed of the mixer blades was initially set at 10 RPM and the total batch size was 250 grams. Over a period of about 5 minutes, about 75% by weight of the LLDPE resin and black masterbatch were slowly added to the chamber of the mixer until it was nearly full. After about 5 minutes of mix time, about 4 grams of the silane was added to the chamber. The mixture at this point was still unmelted. During the period from 5 to 10 minutes after mixing began, an additional 15% by weight of the LLDPE resin and black masterbatch were added to the mixer while maintaining a temperature in the mixer of 110° C. At about 10 minutes of mix time, the temperature of the mixer was raised to 210° C. at a rate of 30° C. per minute. The RPM of the mixer blades was adjusted to ensure that the torque stayed below 10,000 mg as the temperature increased and the mixture melted. The remainder of the LLDPE resin and the black masterbatch was added to the chamber of the mixer as conditions allowed. All of the material had been introduced to the chamber within 17.5 minutes of the initiation of the mixing process. The RPM of the mixer was raised to 20 as soon as the torque would allow. Total mix time from the initial charge of ingredients into the mixer was 26 minutes.

The compound was taken from the mixer, cut up into smaller pieces labeled A through G and milled on a two mill roll at 135° C. for about 5 minutes. UV inhibitor was added during the milling process in the types and amounts set forth on Table 7. As previously described, the UV inhibitor in powder form was added to the melted material on the mill. Each milled sheet was then cut and molded at 350° F. (177° C.) for 4 minutes at 8 tons low pressure and 8 minutes at 25 tons high pressure. A 10 minute water followed by a 1 minute air cool followed while maintaining high pressure. Molded plaques were then cured for 16 hours in 90° C. water.

After making the plaques, about 0.005 inches were shaved off both sides using a SATCABLE slicer to produce smooth surfaces. Physical properties and weather resistant properties for KC10-04 (containing 0.5 weight % carbon black) (see Table 10) and for KC10-05 (containing 0.375 weight % carbon black) (see Table 11) were all acceptable. Conductivity of KC10-04, Sample E with 0.5% carbon black and with UV inhibitors was measured at $2.82 \times 10^{-18}$ $(\Omega\text{-cm})^{-1}$.

The conductivity of KC10-04, Samples A,B,C,D,F and G was not measured. Plaques of KC10-04, Sample E were also subjected to track resistance testing pursuant to ASTM D 2132 guidelines. Time to failure was greater than 230 hours. This complied with ICEA S-66-524 requirements.

TABLE 10

Properties for KC10-04 (0.506% carbon black)

| Property | Sample A | B | C | D | E | F | G | FAA Reqt | ICEA Reqt |
|---|---|---|---|---|---|---|---|---|---|
| Hot Creep, %[1] | 78 | 95 | 95 | 90 | 80 | 95 | 95 | 175 max. | 175 max. |
| Hot Set, % | 0 | 3 | 3 | 0 | 0 | 3 | 9 | 10 max. | 10 max. |
| Track Resistance, hours[2] | NT[4] | NT | NT | NT | >230 | NT | NT | 100 min. | 100 min. |
| Unaged Physical Properties | | | | | | | | | |
| Tensile Strength, psi | 2363 | 2271 | 2153 | 2106 | 2173 | 2137 | 2255 | 1800 min. | 1800 min. |
| Elongation, % | 428 | 366 | 369 | 363 | 378 | 361 | 392 | 250 min. | 250 min. |
| Weathered Physical Properties | | | | | | | | | |
| Retained Tensile Strength, % | 89 | NT | 97 | 96 | 102 | 95 | 95 | — | 80 min. |
| Retained Elongation, % | 80 | NT | 103 | 91 | 103 | 93 | 96 | — | 80 min. |

[1]Hot creep testing was performed at 150° C. per ICEA T-28-562.
[2]Track resistance was performed per ASTM D2132 guidelines.
[3]Weathering of samples was performed per ASTM G 26 in Xenon Arc mode for 720 hours.
[4]"NT" = not tested.
[5]Unaged and weathered physical properties were tested on ¼" dumbbells per ASTM D 412 and pulled at 20 inches per minute. Sample gauge length was 1 inch with a jaw separation of 2.5 inches.

TABLE 11

Properties for KC10-05 (0.375% carbon black)

| Property | Sample A | B | C | D | E | F | G | FAA Reqt | ICEA Reqt |
|---|---|---|---|---|---|---|---|---|---|
| Hot Creep, %[1] | 80 | 70 | 70 | 63 | 75 | 60 | 60 | 175 max. | 175 max. |
| Hot Set, % | 0 | 0 | 0 | 0 | 0 | 0 | 0 | 10 max. | 10 max. |
| Unaged Physical Properties | | | | | | | | 1800 | 1800 |
| Tensile Strength, psi | 2150 | 2212 | 2074 | 2352 | 2212 | 2233 | 2183 | min. | min. |
| Elongation, % | 407 | 413 | 302 | 408 | 370 | 393 | 334 | 250 min. | 250 min. |
| Weathered Physical Properties[2] | | | | | | | | | |
| Retained Tensile Strength, % | 96 | 99 | 101 | 95 | 103 | 96 | 101 | — | 80 min. |
| Retained Elongation, % | 73 | 79 | 88 | 85 | 99 | 88 | 57 | — | 80 min. |

[1]Hot creep testing was performed at 150° C. per ICEA T-28-562.
[2]Weathering of samples was performed per ASTM G 26 in Xenon Arc mode for 720 hours.
[3]Unaged and weathered physical properties were tested on ¼" dumbbells per ASTM D 412 and pulled at 20 inches per minute. Sample gauge length was 1 inch with a jaw separation of 2.5 inches.

Formulation KC10-04, Sample E was considered the best candidate to comply with ICEA S-66-524 and FAA L-824 specifications because of its excellent track resistance, and physical and weathered properties.

A 5 kV nonshielded electrical cable constructed of No. 6 American Wire Gage ("AWG") with insulation corresponding to formulation KC10-04, Sample E was produced and subjected to the test requirements of FAA L-824. The results demonstrated full compliance to the physical, electrical, aging and non-tracking properties needed for applications as underground electrical cable for airport lighting circuits. Test results appear on Tables 12, 13 and 14.

TABLE 12

PHYSICAL PROPERTIES[1]

| Parameter | Result | Technical Requirement |
|---|---|---|
| Insulation Dimensions | | |
| Average Thickness, in. | 0.124 | 0.090 min. |
| Unaged Physical Properties | | |
| Tensile Strength, psi | 2921 | 1800 min. |
| Elongation, % | 415 | 250 min. |
| Aged 7 day/121° C. | | |
| Retained Tensile Strength, % | 97 | 75 min. |
| Retained Elongation, % | 98 | 75 min. |
| Sunlight Resistance, 720 hours Xenon Arc | | |
| Retained Tensile Strength, % | 87 | 80 min. |
| Retained Elongation, % | 97 | 80 min. |
| Hot Creep @ 150° C., % | 25 | 175 max. |
| Hot Set @ 159° C., % | 0 | 10 max. |

[1]Physical property tests were performed on specimens consisting of insulation removed from the cable construction.
[2]tests were conducted per the methods referenced in ICEA S-66-524.

TABLE 13

ELECTRICAL PROPERTIES

| Parameter | Result | Technical Requirement |
|---|---|---|
| 13 kv AC Voltage Test[1] | PASS | PASS |
| Insulation Resistance[2] 15.6° C. water, MΩ-1000 ft. | 2.4 × 10$^5$ | 8060 min. |
| Accelerated Water Absorption[3], 90° C. water. | | |
| SIC, 1 day | 2.32 | 3.5 max. |
| Increase in Capacitance[3],[4] | | |
| 1–14 days, % | 1.4 | 3.0 max. |
| 7–14 days, % | 0.82 | 1.5 max. |
| Stability Factor[3], 14 days | 0.0703 | 1 max. |
| Stability Factor[3] Difference, 1–14 days | 0.0291 | 0.5 max. |

[1]Voltage tests were conducted on a 15 foot test section of cable. Applied voltage was 13 kV AC for 5 minutes.
[2]The insulation resistance was calculated based upon the measured resistance of the cable at 15.6° C. The resistance was calculated from R = K × log$_{10}$ (D/d) where K = 20,000 at 15.6° C. and log$_{10}$ (D/d) = 0.403.
[3]The dielectric constant, increase in capacitance and stability factors were determined from 10 foot test sections of cable in a water bath at 90° C.
[4]Capacitance was measured on the specimen in a water bath at 90° C. with a pH of between 6.0 and 8.0. Measurements were taken after 1, 7 and 14 days.
[5]Tests were conducted per the methods referenced in ICEA S-66-524.

TABLE 14

NON-TRACKING AND OTHER PROPERTIES

| Parameter | Result | Technical Requirement |
|---|---|---|
| Track Resistance, hours | 254 | >100 |
| U-Bend Discharge | PASS | No cracks or failures |
| Surface Resistivity, MΩ | 5.4 × 10$^6$ | 2.0 × 10$^5$ min. |

[1]Track resistance, U-Bend discharge and surface resistivity were performed per the methods referenced in ICEA S-66-524. Track resistance testing followed ASTM D2132 guidelines.

Although preferred embodiments of the present invention have been described and illustrated, it will be understood by those skilled in the art that various modifications may be made without departing from the principles of the invention.

What is claimed is:

1. An insulation material for an electrical cable comprising as ingredients:
   a linear low density polyethylene base resin;
   a black masterbatch comprising a carbon black and a polymer with a melting temperature less than or equal to the melting temperature of said linear low density polyethylene base resin;
   an antioxidant;
   at least one ultraviolet ray inhibitor; and
   a silane composition which includes a crosslinking initiator and a catalyst wherein said ingredients have been crosslinked by means of said silane composition.

2. The crosslinked insulation material of claim 1, wherein said black masterbatch contains a metal deactivator.

3. The cross-linked insulation material of claim 1 or claim 2, wherein said insulation material has a track resistance of ≧100 hours, an unaged tensile strength of ≧1800 psi, an unaged elongation of ≧250%, a retained tensile strength of ≧80% and a retained elongation of ≧80%.

4. The cross-linked insulation material of claim 1 or claim 2, wherein said linear low density polyethylene base resin has a melt index of about 0.7 and a specific gravity of about 0.92.

5. The cross-linked insulation material of claim 1 or claim 2, wherein said black masterbatch contains about 25% by weight of said carbon black.

6. The cross-linked insulation material of claim 1 or claim 2, wherein said carbon black comprises about 0.500 percent by weight of said insulation material.

7. The cross-linked insulation material of claim 1 or claim 2, wherein said linear low density polyethylene base resin comprises about 96.4% by weight of said insulation material, said black masterbatch comprises about 2% by weight of said insulation material and said silane comprises about 1.6% by weight of said insulation material.

8. The cross-linked insulation material of claim 1 or claim 2, wherein said linear low density polyethylene base resin comprises from 96.4 percent to 96.9 percent by weight of said insulation material, said black masterbatch comprises from 1.5 to 2 percent by weight of said insulation material, and said silane comprises 1.6 percent by weight of said insulation material.

9. The cross-linked insulation material of claim 1 or claim 2 wherein said antioxidant is a polyphenol.

10. The cross-linked insulation material of claim 1 or claim 2, wherein said ultraviolet ray inhibitor is selected from the group consisting of titanium dioxide, hindered amine, substituted benzotriazole, and mixtures thereof.

11. The cross-linked insulation material of claim 1 or claim 2, wherein said insulation material has a hot creep of <150 percent, a hot set of ≦9 percent, a track resistance of >230 hours, an unaged tensile strength of >2100 psi, an unaged elongation of >360 percent, a retained tensile strength of >89 percent, and a retained elongation of >80 percent.

12. A track resistant, non-shielded, electric power cable comprising:

a central conductor core;

a conductor shield encircling said conductor core; and a radially uniform insulation layer, encircling said conductor shield, comprising the cross-linked insulation material of claim 1 or claim 2.

13. A method of producing a track resistant, cross-linked insulation material for an electric cable comprising the steps of:

mixing a quantity of a linear low density polyethylene base resin and a quantity of a black masterbatch comprising a carbon black, a polymer with a melting temperature less than or equal to the melting temperature of said linear low density polyethylene base resin, and an antioxidant in a mixer preheated to a temperature less than the melting temperature of said linear low density polyethylene and said black masterbatch;

mixing said linear low density polyethylene base resin and said black masterbatch in said mixer to insure said linear low density polyethylene base resin and said black masterbatch are uniformly distributed within said mixer;

adding a quantity of a silane, having a boiling point less than the temperature of said mixer, to said linear low density polyethylene base resin and said black masterbatch in said mixer;

mixing said silane, linear low density polyethylene base resin and black masterbatch in said mixer to insure said linear low density polyethylene base resin, black masterbatch and silane are uniformly distributed in said mixer;

adding an additional quantity of said linear low density polyethylene base resin and said black masterbatch in said mixer;

mixing said quantities of silane, linear low density polyethylene base resin and black masterbatch in said mixer to insure said silane, linear low density polyethylene base resin and black masterbatch are uniformly distributed in said mixer;

increasing said temperature of said mixer to a temperature greater than or equal to the boiling point of said silane and greater than or equal to the melting point of said linear low density polyethylene base resin and said black masterbatch;

adding a further quantity of said linear low density polyethylene base resin and said black masterbatch to said mixer;

mixing said silane, linear low density polyethylene base resin and black masterbatch in said mixer to insure said silane, linear low density polyethylene base resin and black masterbatch are uniformly distributed in said mixer, thereby forming a compound;

milling said compound;

adding at least one ultraviolet inhibitor to said compound;

molding said compound containing said ultraviolet inhibitor;

cooling said compound; and curing said compound.

14. The method of claim 13, wherein said black masterbatch includes a metal deactivator.

* * * * *

UNITED STATES PATENT AND TRADEMARK OFFICE
CERTIFICATE OF CORRECTION

PATENT NO. : 6,337,367 B1
DATED : January 8, 2002
INVENTOR(S) : Cope

It is certified that error appears in the above-identified patent and that said Letters Patent is hereby corrected as shown below:

Column 1,
Line 51, change "FM" to -- FAA --;

Column 7,
Line 13, change "580-656" to -- 580,650 --;

Column 12,
Table 10, line 2, change "0.506%" to -- 0.500% --;
Table 10, line 14, change "366" to -- 388 --;

Column 13,
Line 37, change "159°" to -- 150° --.

Signed and Sealed this

Tenth Day of September, 2002

Attest:

JAMES E. ROGAN
Attesting Officer
Director of the United States Patent and Trademark Office